United States Patent [19]

Schmidt

[11] Patent Number: 5,779,273

[45] Date of Patent: Jul. 14, 1998

[54] HEIGHT ADJUSTER FOR VEHICLE SAFETY BELT

[75] Inventor: Reinhard Schmidt, Lennestadt, Germany

[73] Assignee: R. Schmidt GmbH, Lennestadt, Germany

[21] Appl. No.: 695,798

[22] Filed: Aug. 12, 1996

[30] Foreign Application Priority Data

Aug. 21, 1995 [DE] Germany .......... 195 30 663.5

[51] Int. Cl.[6] .................................. B60R 22/20
[52] U.S. Cl. ........................... 280/801.2; 280/808
[58] Field of Search .................. 280/801.2, 804, 280/808

[56] References Cited

U.S. PATENT DOCUMENTS

4,469,352  9/1984  Körner et al. .......... 280/801.2
4,538,832  9/1985  Anderson .............. 280/801.2
4,884,825  12/1989  Grunewald et al. ...... 280/801.2
4,989,900  2/1991  Steinhüser ............ 280/808

*Primary Examiner*—Kenneth R. Rice
*Attorney, Agent, or Firm*—Evenson, McKeown, Edwards & Lenahan, PLLC

[57] ABSTRACT

A height adjuster for a vehicle safety belt with an adjusting element features two gears that can rotate on the adjusting element. The gears are braced against two support points in two opposing denticulations of a guide rail essentially symmetrical to a longitudinal middle plane running in the longitudinal direction of the guide rail. A catch element engages adjustably, in the longitudinal middle plane, with the denticulations of the two gears.

26 Claims, 5 Drawing Sheets

HEIGHT ADJUSTER FOR VEHICLE SAFETY BELT

BACKGROUND OF THE INVENTION

In a typical height adjuster known from DE 3,448,384 C2 for a motor vehicle safety belt, forces exerted from the reversing mount are introduced from one side by means of a blocking element designed as a gear into an opposing denticulation of the guide rail attached to the motor vehicle superstructure.

From DE 4,011,767 A1, a height adjuster with a two-part adjusting element is known. In this height adjuster, a gear is provided on one part of the adjusting element, and on the other part of the adjusting element, a mounting device in the form of a mounting bolt is provided for the safety belt reversing mount. The gear provided on one part of the adjusting element is engaged on one side with an opposing denticulation of the guide rail. At the other part of the adjusting element, which is tipped and offset in the engaged position, a catch protrusion is provided which engages into the other, opposing denticulation of the guide rail. Forces introduced from the safety belt via the mounting element are thus introduced in an asymmetrical manner into the guide rails.

SUMMARY OF THE INVENTION

The purpose of this invention is to create a height adjuster, of the kind mentioned above, in which the forces emanating from the safety belt are introduced in a symmetrical manner into the guide rails mounted to the vehicle superstructure.

In this invention, two gears are mounted on the adjusting element so as to be able to rotate. The gears engage at two support points in two opposing denticulations which are provided on both sides of a longitudinal middle plane on the guide rails. The engagement occurs essentially symmetrical to the longitudinal middle plane running in the longitudinal direction of the guide rail. At these engagement points of the two gears the adjustment element will be braced against the guide rails in the respective adjusted height position of the adjusting element. The catch element for blocking of the gear rotation is located in the longitudinal middle plane and is controlled with the engaged denticulations of the two gears. The catch element, in this case, can be engaged with and disengaged from the denticulations of the two gears. The gears act as guide and blocking elements.

The two gears have axes which are located on both sides of the longitudinal middle plane at an equal spacing from the longitudinal middle plane. The longitudinal middle plane extends vertically to the planar reverse surface of the guide rails and roughly parallel to the two vertically spaced legs of the guide rails, in which the opposing denticulations of the guide rails are provided in the form of perforations.

The engaged catch element can be controlled with the denticulations of the two gears in such a manner that it is pressed into the engaged position by a force exerted by the safety belt onto the mounting element, in p articular by a shift of the body of a vehicle passenger in the blocked safety belt.

The forces introduced by the safety belt via the mounting device are applied essentially by the catch device into the two gears and into the guide rails mounted to the vehicle superstructure. Consequently, the rotary bearing of the two gears is located outside of this friction fit, and can be made of plastic, for example. The denticulations of the gears are in contact on both sides of the catch device.

In a preferred manner, the adjusting element is of two-part design, and the two gears are mounted so as to be able to rotate on the first part of the adjusting element, which can have the shape of a plate or a frame. The first part of the adjusting element can be made of plastic. The attachment element for the terminal mounting or reversing mounting of the safety belt can be provided, for example, in the form of a mounting bolt. The catch element, on the second part of the adjustment element which can be designed as a locking plate, has the function of an impact unit. The two parts of the adjustment element (frame and locking plate or impact unit) can slide with respect to each other against the pretensioning force, for example, of a tensioning spring, in order to move the catch element into the denticulations of the two gears to block the rotation of the gear, or to release the blocking of the gear rotation by to removal of the catch element from its engagement. The forces applied by the denticulations into the catch element are opposite to one another. In this embodiment, the gears are not located on the mounting unit or the locking plate, but rather on the frame, which can be made of plastic.

Furthermore, two prepositioning sites constructed to be elastic are located on the adjusting element, in particular on the first, preferably plastic, part of the adjusting element. These prepositioning sites perform control functions during height adjustment along with the two gears. Based on their elastic construction, they engage during the height adjustment in the particular opposing denticulation of the guide rail and thus form a prepositioning of the adjusting element during its height adjustment. The prepositioning sites have a particular distance from the respective teeth of the gears which are engaged to form the support positions; this distance is adapted to the distance of the respective engaged positions of the opposing denticulations of the guide rails. In particular, this distance is a whole number multiple of the respective spacing of the engaged sites of the opposing denticulations on the guide rails. Also, the prepositioning sites are preferably located symmetrically with respect to the longitudinal middle plane. In this manner, a four-point positioning of the adjusting element is achieved in the height adjustment and in the particular height position.

BRIEF DESCRIPTION OF THE DRAWINGS

The invention will be explained in greater detail below with respect to the figures.

DESCRIPTION OF THE PREFERRED EMBODIMENTS

Figure 1:
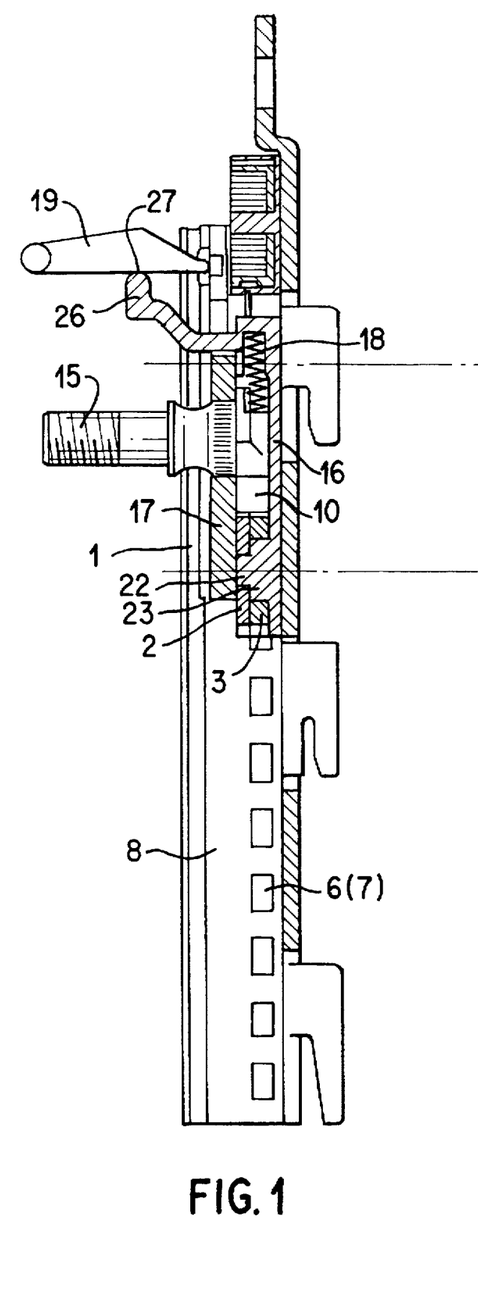
FIG. 1 is a side cross-sectional view of a first embodiment.
Figure 2:
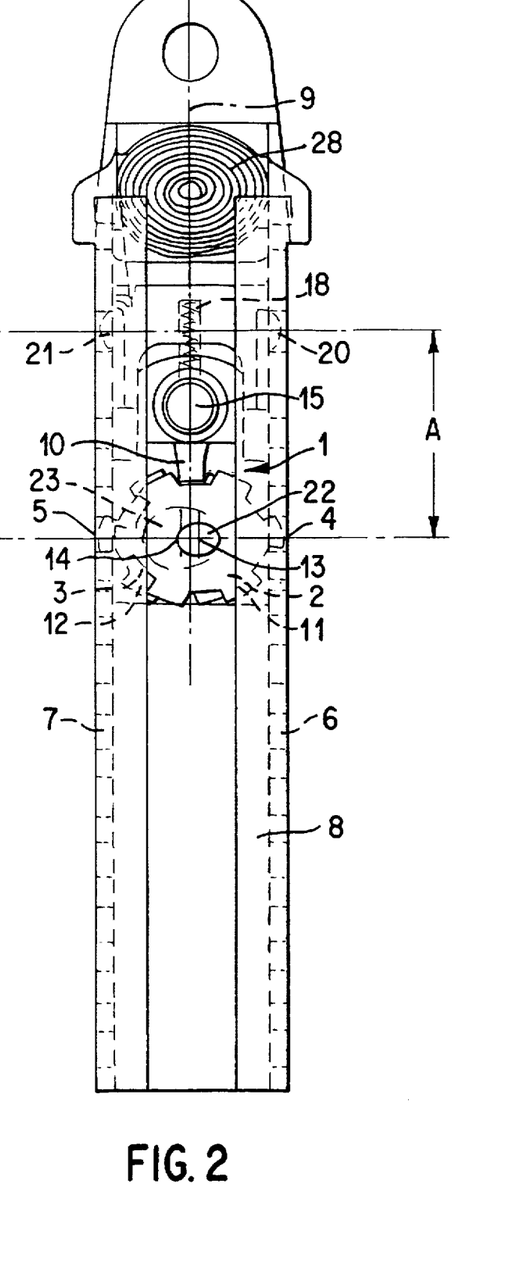
FIG. 2 is a top view of the first embodiment.
Figure 3:
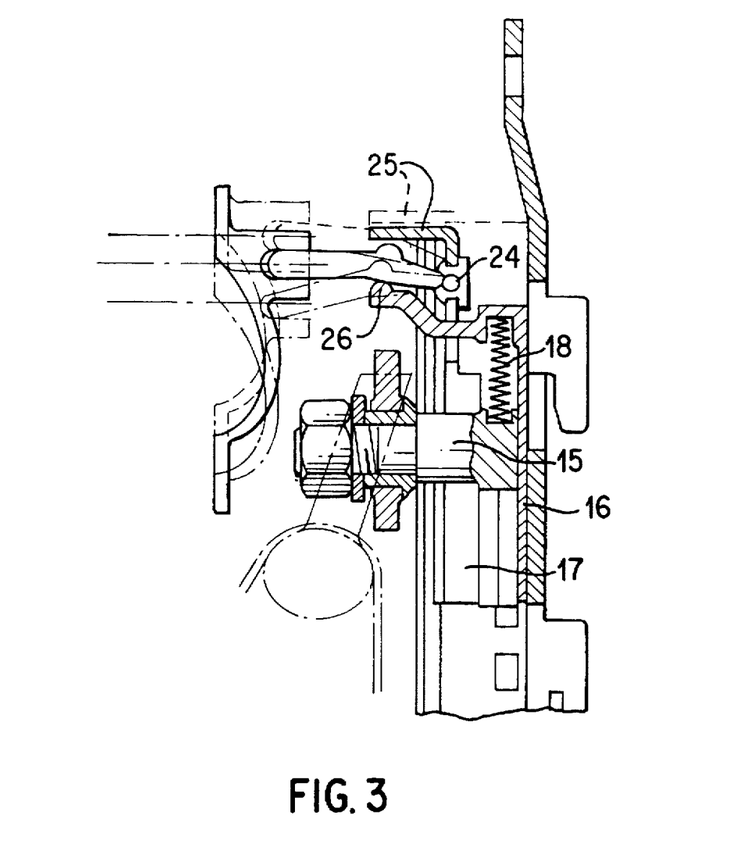
FIG. 3 shows various operating positions of the first embodiment.

The height adjuster for a motor vehicle safety belt illustrated in FIGS. 1 to 3 has, a guide rail 8. An adjusting element 1 is height adjustable along the guide rails. The adjusting element 1 consists of two parts, namely, a first part of the adjusting element designed as a base plate 16 and a second part of the adjusting element designed as a locking plate 17. Two gears 2 and 3 are mounted so as to rotate on the base plate 16, which can be made of plastic. Journal pins 22 and 23 are formed at the base plate 16. The journal pin 22 forms a rotary axis 13 for the gear 2, and journal pin 23 forms a rotary axis 14 for the gear 3. The gears 2 and 3 have a control function in the height adjustment and, during positioning in a particular height position, they cooperate with a catch element 10 to perform a locking function.

The support bar 8 has a U-shaped profile. Opposing denticulations 6 and 7 are located in the lateral legs; these denticulations are in the shape of perforations that have a defined distance from one another. The two gears 2 and 3 engage with their teeth 11 and 12 into these opposing denticulations 6 and 7. The gear 2 engages in the opposing denticulation 6 and gear 3 engages in the opposing denticulation 7.

Figure 8:
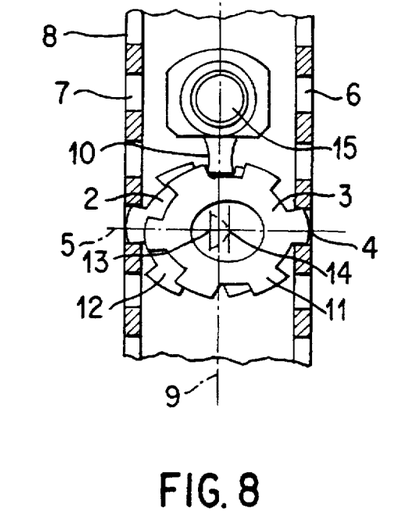
FIG. 8 illustrates the operating positions of catch elements and gears acting as blocking elements during blocking of gear rotation.
Figure 9:
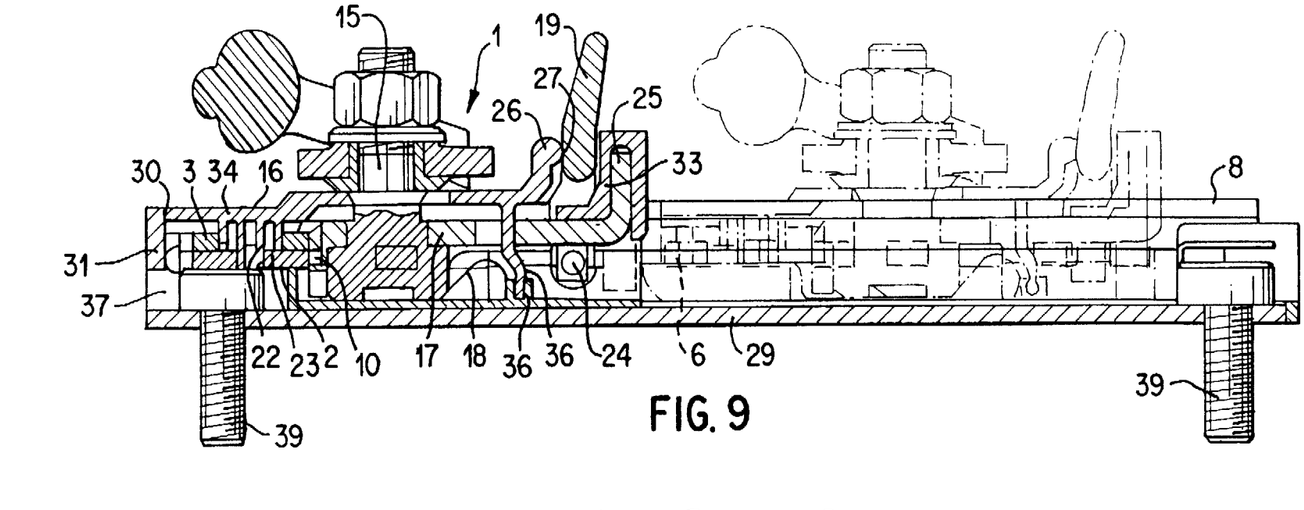
FIG. 9 is a cross-sectional side view of a third embodiment.
Figure 10:
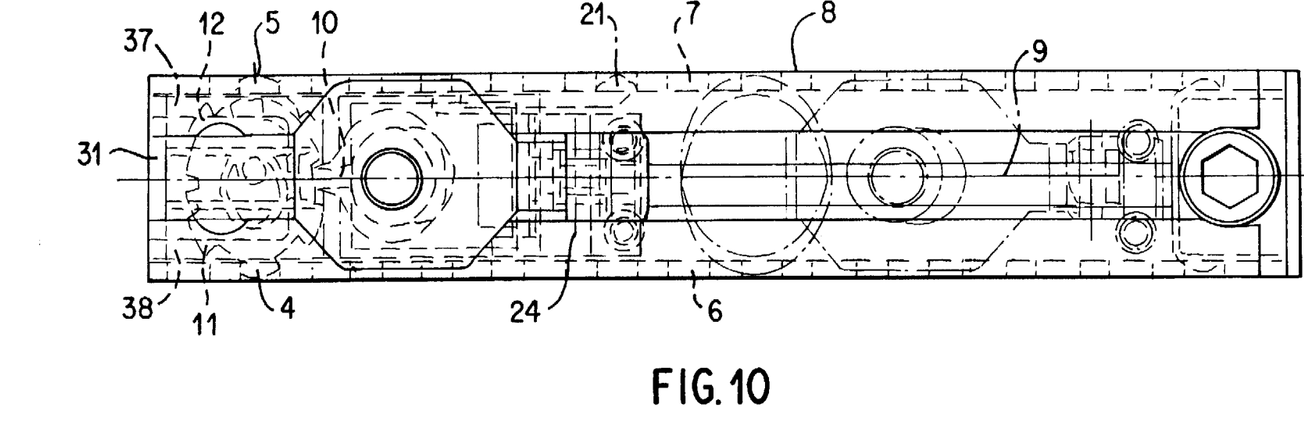
FIG. 10 is a top view of the third embodiment.

Both during the height adjustment and, also, in the engaged position of the adjusting element set to a particular height position, a symmetrical guidance and support for the adjusting element 1 is reached by the tooth engagement symmetrical to a longitudinal middle plane 9 at bracing points or support points 4 and 5. The two support points 4 and 5, which are formed by two teeth of the denticulations 11 and 12 engaging in the opposing denticulations 6 and 7, are located symmetrical to the longitudinal middle plane 9. The longitudinal middle plane 9 runs vertically in the drawing of FIG. 2 and extends in the longitudinal direction of the guide rail 8. The middle plane is located midway between the two legs, which have the opposing denticulations 6 and 7. The longitudinal middle plane 9 extends roughly parallel to these legs of the guide rail 8. FIG. 8 shows details of engagement of the respective tooth of the gears 11 and 12 of the two gears 2 and 3 at the two support points 4 and 5.

The two shafts 13 and 14 of the gears 2 and 3 are likewise equally spaced with respect to the longitudinal middle plane 9. With regard to the smooth reverse surface of the guide rails 8 and/or the base plate 16, the two gears 2 and 3, as is evident in FIG. 1, are located at a slightly different height position with respect to one another. The two engagement sites 4 and 5 are accordingly offset with respect to one another, but with regard to the longitudinal middle plane 9 they have a symmetrical arrangement, as is visible from the top view of FIG. 2. The two gears 2 and 3 also have the same outer perimeter, so that the support points or bracing points 4 and 5 are equidistant from the longitudinal middle plane 9.

The catch element 10 is mounted on the second part of the adjusting element constructed as locking plate 17. Furthermore, a mounting element 15 constructed as a bolt is attached to the locking plate 17 for the terminal mounting or reversing mounting of the safety belt. The locking plate 17 is guided positively connected against the support rail 8 and can slide with respect to the base plate 16. A pretensioning spring 18 is acting between the base plate 16 and the locking plate 17. The catch element 10 is pretensioned by the pretensioning spring 18, in the engaged position, into the denticulations 11 and 12 of the two gears 2 and 3 illustrated in FIG. 8. The catch element 10 and the axis of the mounting element 15 constructed as a bolt are located on the longitudinal middle plane 9. The two components take on this position in the engaged position, as is illustrated in FIG. 8. The adjusting element 1, in a particular height position, will catch in this engaged position due to the cooperation of the catch element with the gears 2 and 3 acting as blocking elements. Due to the engaging of the catch element into the denticulations 11 and 12 of the gears 2 and 3, the rotation of the gears is blocked, so that a continuing movement of the adjusting element and of the attached mounting element 15 is blocked for the terminal mount or reversing mount. This position is the middle operating position denoted in FIG. 3 as the "catch position."

If forces are introduced in this operating position via the safety belt—for example, by a shift of the body of a vehicle passenger in the blocked safety belt—into the mounting element 15, then these forces are introduced via the catch element and the two gears or blocking elements 2 and 3 symmetrically to the longitudinal middle plane 9 into the guide rails 9 against the support points 4 and 5. The support points 4 and 5 are formed by the particular teeth of the denticulations 11 and 12 of gears 2 and 3 engaged with the opposing denticulations 6 and 7. The corresponding engaged positions or openings of the opposing denticulations 6 and 7 against the guide rails 8. The denticulations 11, 12 are in contact on both sides of the catch element 10.

The two gears 2 and 3 are of disk like shape and overlap each other over a large area. Furthermore, on the top side of the upper gear 2, the locking plate 17 is braced over a large area as is seen, in particular, from FIG. 1. The lower gear 2 lies flat on the base plate 16. In this manner, a form fit over a large area is attained between the base plate, the two gears 2 and 3 and the locking plate 17. Since the base plate 16 has a contact over a large area on the back side of the guide rail 18, the locking plate, together with the base plate, forms a bond representing the adjusting element 1, which moves with a large contact surface against the guide rail 8. The guidance is done for all essential parts parallel to the longitudinal middle plane 9. Both in the height adjustment of the adjusting element 1 and also in the movement of the base plate 16 and locking plate 17 toward one another, the individual components, namely the mounting element 15 and the catch element 10 and, also, the journal pins 22 and 23 of the disk-like gears 2 and 3 forming the rotary shafts 13 and 14, move along and parallel to the longitudinal middle plane 9. Furthermore, the flow of force between the mounting element 15, the catch element 10, the two gears 2 and 3 and the guide rails 8, takes place without offset and tipping of the individual components, since these make contact over a large area with each other.

To adjust the height, an actuator in the form of an actuator lever 19 is mounted on the locking plate 17 so as to be able to pivot. Based on FIG. 3, the upward and downward height adjustment will be explained in greater detail. During an upward height adjustment, the actuator lever 19, which is braced against the locking plate 17 in the pivot axis 24, will pivot upward. In this case it comes to rest against a stop 25 which is molded onto the locking plate. Due to the application of additional force, the locking plate 17 pushed upward, so that the catch element 10 is removed from the denticulations 11 and 12 of the two gears 2 and 3. This movement takes place against the force of the pretensioning spring 18. The pretensioning spring 18 formed as coil spring will then be compressed by a certain amount. During additional upward motion of the actuator lever 19, the base plate 16—against which the compressed pretensioning spring 18 is braced—will also be moved upward, so that the following teeth of the denticulations 11 and 12 will engage in corresponding engagement sites (perforations) of the opposing denticulations 6 and 7 at the guide rails 8.

As shown in FIG. 2, elastic prepositioning sites 20 and 21 in the form of protrusions are on the base plate 16 and they can snap elastically the engagement positions (perforations) of the opposing denticulations 6 and 7. The spacing A (FIG. 2), between the respective prepositioning sites 20 and/or 21 and a particular tooth of the gears 2 and 3 in the locked position (FIG. 3) and/or the alignment line on which the two shafts 13, 14 of the gears 2, 3 are resting, is adapted to the distance of the engagement sites (perforations) of the opposing teeth 6 and 7. This distance occurring in the respective engaged height position is indicated in FIG. 2. This spacing occurs, as will be explained below, even when the catch element 10 is again brought into the engaged position with the denticulations 11 and 12 (FIG. 8). This is attained by releasing the actuator lever 19 in the desired height position, so that, based on the restoring force of the pretensioning spring 16, the locking plate is shifted with respect to the base plate so that the prepositioning sites 20 and 21 remain in the particular engaged sites of the opposing denticulations 6 and 7. The denticulations 11 and 12 of the two gears 2 and 3 are thus brought into a position so that the catch element 10 engages with these denticulations in the manner shown in FIG. 8, i.e., between two teeth, and that corresponding teeth of the gears 11 and 12, together with the associated engaged sites of the opposing denticulations 6 and 7, form the support points 4 and 5, as is likewise shown in FIG. 8. The height adjuster is then in the desired catch height position.

During the downward adjustment of the height adjuster, the actuator lever 19 is pressed downward, so that it contacts a stop 26 of the base plate 16, which is ran through an opening or recess of the locking plate 17 (FIG. 3). Due to the downward directed pressure on the actuator lever 19, an additional lever pivot axis is formed at the contact point 27 of the actuator lever 19 at the stop 26 of the base plate 16 (FIG. 1). The lever formed at one side then acts as a two-side lever around the pivot axis formed at the contact point 27. Due to the force applied to the external lever arm, the outer lever arm pivots downward around the contact point 27, and the inner lever arm pivots upward between the contact point 27 and the pivot as 24. Thus, opposing movements are applied against the pretensioning force of the pretensioning spring 18 on the base plate 16 and the locking plate 17. Due to these opposing movements, the catch element 10 again disengages from the denticulations 11 and 12 of the gears 2 and 3. After additional force application onto the outer lever arm, with compressed pretensioning spring 18, the adjusting element 1, formed by the base plate and locking plate, will move downward, so that, as explained above, a prepositioning of the adjusting element 1 at the guide rail 8 is likewise attained by the prepositioning sites 20 and 21.

When releasing the actuator lever 19, under the effect (restoring force) of the pretensioning spring 18, the catch element 10 is brought into the engaged position between two teeth with the gears 2 and 3 illustrated in FIG. 8; their respective teeth between the associated engaged positions of the opposing denticulations 6 and 7 form the support points 4 and 5.

During the height adjustment (FIG. 3), two kinematics of force application are therefore used. During the upward height adjustment, the actuator part formed as actuator lever 19 acts on the locking plate 17, and during the downward adjustment, the actuator part (actuator lever 19) acts on the base plate 16. The movement of the catch element to engage and disengage with the denticulation 11 and 12 of the gears 2 and 3 takes place based on an opposing movement of the locking plate 17 and the base plate 16.

The prepositioning sites 20 and 21 provided in the form of elastic protrusions, make an elastic engagement during the adjusting motion, with the opposing denticulations 6 and 7, so that upon additional adjustment, the particular engagement force acts due to the external force applied onto the actuator (actuator lever 19).

Due to the action (restoring force) of the pretensioning spring 18, the two parts of the adjusting element (base plate 16 and locking plate 17) are held together and form the adjusting element 1.

As is evident from FIG. 2, a comfort spring 28 can be provided with a spring force of about 3N to compensate for forces emanating in normal operation from the safety belt and acting on the adjusting element 1. The comfort spring 28 can be connected to the base plate 16.

In the embodiments illustrated in FIGS. 4 to 9, the same or equivalent components have the same reference numbers as used in the first embodiment of FIGS. 1 to 3.

In these embodiments, the first adjusting element 16 consists of a base plate 34, on which the two journal pins 22, 23 for the gears 2 and 3 are formed, and also of a plate 29 moving on the reverse surface of the guide rail 8. The base plate 34, for simplified mounting of the gears 2 and 3 by means of a hinge 30, which is constructed as a film hinge in the embodiment, is mounted on the plate 29 so as to be able to pivot by means of a bar 31, which is connected to the plate 29. The base plate 34 and the plate 29 are two frame parts of a frame forming the first part of the adjusting element 16, against which the second part of the adjusting element 17 (locking plate) is braced by means of the pretensioning spring 18. The pretensioning spring 18 is formed as a leaf spring which also extends for rattle-proof support of the locking plate in the frame between the plate 29 and the locking plate 17. Due to the pretensioning of the spring 18, the catch element 10 is pressed between two teeth of the denticulations 11 and 12 of the two gears 2 and 3 as in the first design example (FIG. 8). The spring 18 is braced against a stop 32 (FIG. 4) which is formed on the first part of the adjusting element 16, on the one side and on the other side at the second part of the adjusting element 17 (locking plate). The frame (part of the adjusting element 16) formed from the base plate 34 and the plate 29 can be made of plastic, since externally applied forces are applied into the guide rail 8 by means of the mounting element 15, the catch element 10 and the two gears 2 and 3. The two gears 2 and 3 are likewise of disk-like design, make a large area contact with each other and are held between the two frame parts, namely, the base plate 34 and the plate 29.

Figure 4:
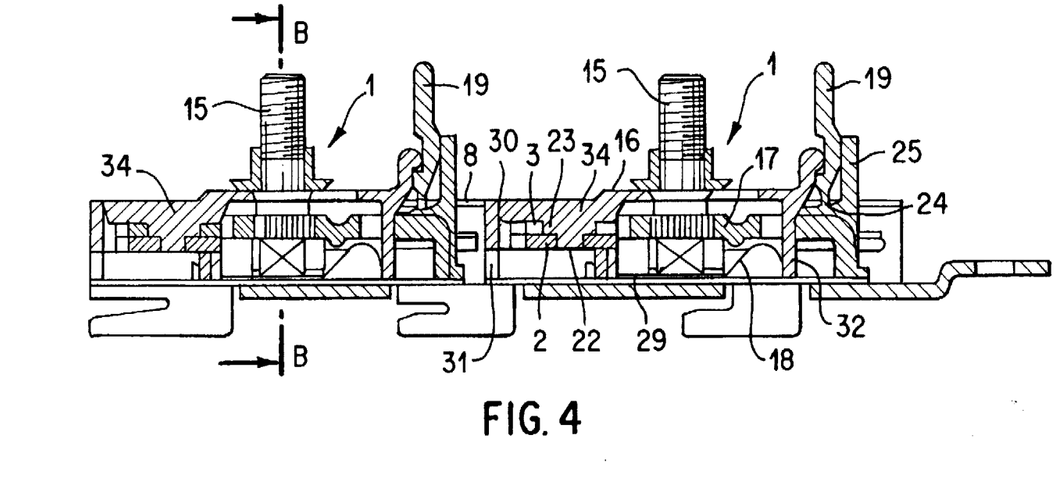
FIG. 4 is a cross-sectional view of a second embodiment with simultaneous representation of the lower and upper adjusted positions.
Figure 5:
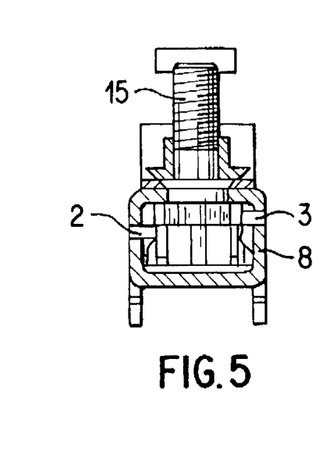
FIG. 5 is a cross-sectional view along section line B—B of FIG. 4.
Figure 6:
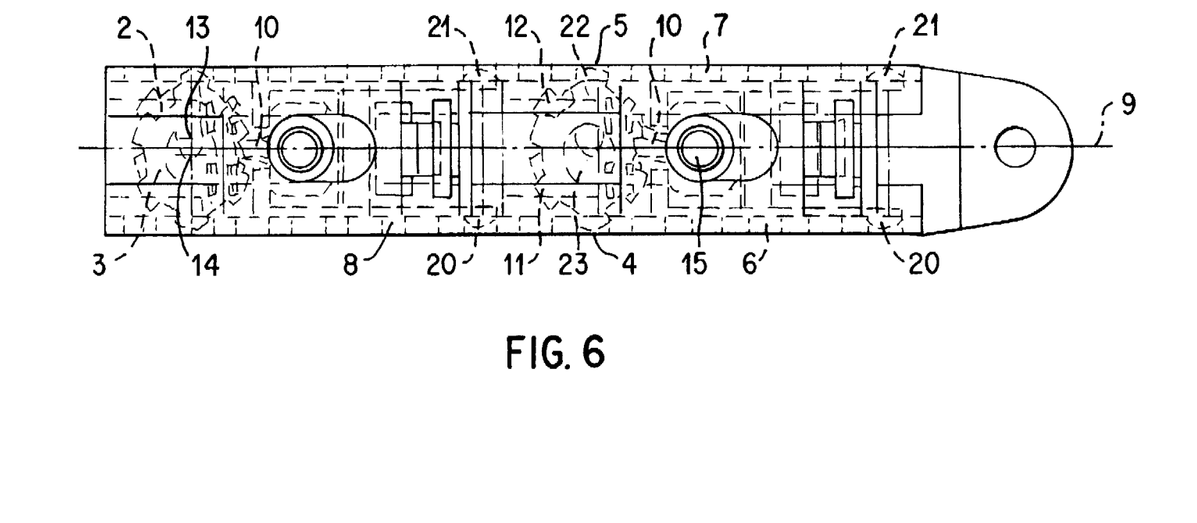
FIG. 6 is a top view of the second embodiment.

The locking plate 17 consists of a heavy material, for example, Zamak. The upper part of the locking plate 17 is coated with plastic, and in the embodiment of FIGS. 4 to 6, the stop 25 is made of a plastic molding. Furthermore, in this embodiment, the actuator lever 29 is of pivot design. In this case, the pivot axis 24 is formed by the molded site of the actuator lever 19 (FIG. 4).

The base plate 34 is supported on the plate 29 by means of a support base 36, as is indicated in particular in FIG. 8. The support base 36 has its lower end tightly clipped into a recess 35, which is molded to the plate 29.

The pivot as 24 for the actuator element 19 designed as actuator lever is formed by pins molded to both sides of the actuator element 19; these pins can rotate in corresponding recesses of a shaped plastic element 33. The shaped plastic element 33 is attached to the locking plate 17. In the illustrated embodiment, the shaped plastic element 33 is placed onto the stop 25 of the locking plate 17.

The two gears 2 and 3 lie between the two frame parts, namely the base plate 34 and the plate 29. In this case, contact bars 37, 38 are molded on the plate 29. The contact bars 37 and 38 are separated such that in the lower end position, the two contact bars 37 and 38 are moved past alongside a screw head of a mounting screw 39. The height of the two contact bars 37 and 38 is adapted to the height of the screw head.

As is also seen in FIG. 8, the pretensioning spring 18 is braced against the recess 35, in which the support base 36 is installed, and presses the locking plate 17 with the attached catch element 10 in the blocked position between the teeth of gears 2 and 3.

A premounted structural unit is obtained in and on the frame formed by the first part of the adjusting element 16. This occurs because the second part of the adjusting element 16 in the embodiment of FIGS. 4 to 9 is of two-part construction, and the two parts pivot with respect to each other by means of the hinge 20 and can be connected with each other by means of a plug connection (holder 35 and support base 36). The two gears 2 and 3, the locking plate 17, the actuator 19 and the mounting element 15 in this structural unit are likewise provided, if necessary, with the reversing mount. This structural unit can then be installed in the premounted state into the guide rail 8.

Figure 7:
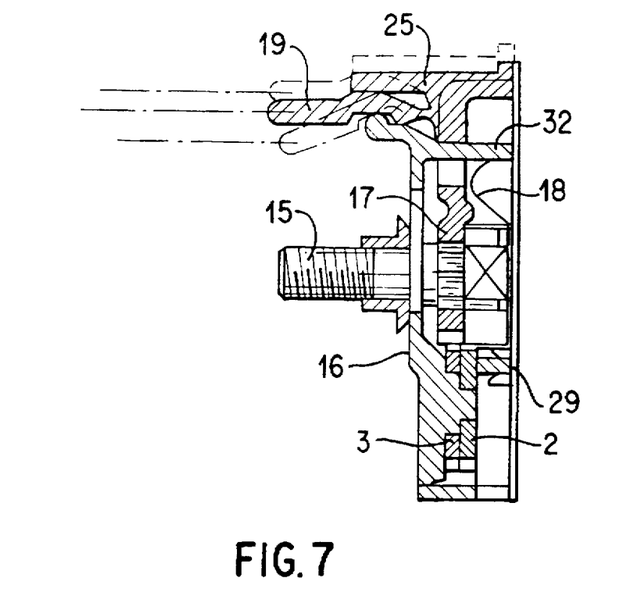
FIG. 7 shows various operating positions of the second embodiment.

The adjusting process in the embodiments according to FIGS. 4 to 9 takes place in the same manner as in the first embodiment and is illustrated schematically in FIG. 7. In the upward adjusting motion (to the right in the Figures) the actuator element 19 rests against the stop 25 of the locking plate 17 and pulls the catch element 10 from the blocking engagement with the teeth of the gears 2 and 3. Due to the externally applied adjusting force, e.g. applied manually on the actuator element 19, the adjusting element 1 is adjusted upward into the desired position. During the downward adjusting motion, the actuator 19 pivots counterclockwise about the pivot axis 24, and the externally applied actuation pressure is braced against the contact site 27 at the stop 26 of the first part of the adjusting element 16. The resultant torque pulls the locking plate 17 with the catch element 10 out of the denticulation of the gears 2 and 3, so that the downward adjusting motion (to the left in the Figures) can take place into the desired setting. The adjusting motions are obtained from the movement of the locking plate with respect to the first part of the adjusting element 16, which is provided in the form of a frame in embodiments 4 to 10. This motion occurs against the force of the pretensioning spring 18, which tensions the locking plate 17 in the blocked position, i.e., in the blocking engaged position between the teeth of the gears 2 and 3 (FIG. 8). In the adjusting motion, due to the actuating force exerted onto the actuating element exerted externally via the first part of the adjusting element 16, a torque driving the gears 2 and 3 is exerted, so that the gears act as transmission and guide elements during the adjusting motion.

What is claimed is:

1. A height adjuster for a vehicle safety belt comprising:
   an adjusting element,
   a guide rail on which the adjusting element runs and including opposing denticulations,
   a mounting element for a terminal mount or reversing mount of the safety belt anchored to the adjusting element,
   a catch element that snaps in and locks the adjusting element at certain height positions,
   two gears rotatable on the adjusting element and braced at two support points in two opposing denticulations of the guide rail essentially symmetrical to a longitudinal middle plane running in the longitudinal direction of the guide rail, the catch element engaging adjustably in the longitudinal middle plane with the denticulations of the two gears to block rotation of the gears and lock the adjusting element and release blocking of the rotation for adjusting height of the belt.

2. A height adjuster according to claim 1, characterized in that the two gears have shafts and wherein the gears and their shafts are located on both sides of the longitudinal middle plane and at an equal distance from the longitudinal middle plane.

3. A height adjuster according to claim 1, characterized in that outer perimeters of the gears have the same diameter.

4. A height adjuster according to claim 1, characterized in that the catch element is controlled while it is engaged with the gears in such a manner that it is pressed into an engaged position by a force exerted by the safety belt onto a mounting element.

5. A height adjuster according to claim 4, characterized in that the adjusting element is of two part design and the two gears are located on a first part of the adjusting element and the mounting element is located on a second part of the adjusting element.

6. A height adjuster according to claim 5, characterized in that the catch element is provided on the second part of the adjusting element.

7. A height adjuster according to claim 1, characterized in that forces applied by the denticulations into the catch element have opposing directions.

8. A height adjuster according to claim 4, characterized in that the mounting element is located in respective engaged height positions in the longitudinal middle plane.

9. A height adjuster according to claim 8, characterized in that the mounting element can slide in the longitudinal middle plane.

10. A height adjuster according to claim 5, characterized in that the two parts of the adjusting element can slide opposite each other against a pretensioning force.

11. A height adjuster according to claim 10, characterized in that displacement of the two parts of the adjusting element are opposite each other parallel to the longitudinal middle plane or the height adjusting direction.

12. A height adjuster according to claim 5, characterized in that an actuator is engaged to transfer an upward adjusting force on one of the two parts of the adjusting element during an adjusting motion and downward on the other of the two parts of the adjusting element during the adjusting motion.

13. A height adjuster according to claim 5, characterized in that forces applied to the mounting element are initiated essentially by the second part of the adjusting element, the catch element and the two gears into the guide rail mounted to a vehicle superstructure.

14. A height adjuster according to claim 5, characterized in that the first part of the adjusting element is made of plastic.

15. A height adjuster according to claim 5, characterized in that two additional, prepositioning sites constructed to be elastic are provided for the adjusting element, and their distances to teeth of the gears currently engaged with the opposing denticulations are adapted to a spacing of the engaged locations of the opposing denticulations.

16. A height adjuster according to claim 15, characterized in that the two prepositioning sites engaged with the opposing denticulations and the two gears likewise engaged with the opposing denticulations use a four-point positioning of the adjusting element on the guide rail.

17. A height adjuster according to claim 15, characterized in that the two prepositioning sites are positioned symmetrical with regard to the longitudinal middle plane.

18. A height adjuster according to claim 15, characterized in that the two prepositioning sites are located on the first part of the adjusting element.

19. A height adjuster according to claim 18, characterized in that the gears and the first and second parts of the adjusting element make a positive connection with smooth surfaces parallel to the direction of height adjustment.

20. A height adjuster according to claim 12, characterized in that the actuator is mounted on one part of the adjusting element so as to be able to pivot.

21. A height adjuster according to claim 20, characterized in that the actuator is braced against the other part of the adjusting element during a downward adjusting motion.

22. A height adjuster according to claim 12, characterized in that the actuator is pivot mounted to a shaped plastic element which is mounted to the second part of the adjusting element having the catch element.

23. A height adjuster according to claim 5, characterized in that the first part of the adjusting element holding the two gears includes two frame parts that can be connected together.

24. A height adjuster according to claim 23, characterized in that the two frame parts are connected to each other by a hinge and a plug connector.

25. A height adjuster according to claim 5, characterized in that the second part of the adjusting element is mounted on the first part of the adjusting element so as to be able to move against a pretensioning force which presses the second part of the adjusting element with the catch element into a blocking position.

26. A height adjuster according to claim 5, characterized in that the first part of the adjusting element can slide along the guide rail.

* * * * *